US012696273B2

(12) United States Patent
Baek et al.

(10) Patent No.: US 12,696,273 B2
(45) Date of Patent: Jul. 28, 2026

(54) METHOD AND APPARATUS FOR PRIORITIZATION INSIDE CONFIGURED GRANT

(71) Applicant: SAMSUNG ELECTRONICS CO., LTD., Suwon-si (KR)

(72) Inventors: Sangkyu Baek, Suwon-si (KR); Anil Agiwal, Suwon-si (KR); Sangjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 18/696,929

(22) PCT Filed: Sep. 28, 2022

(86) PCT No.: PCT/KR2022/014573
§ 371 (c)(1),
(2) Date: Mar. 28, 2024

(87) PCT Pub. No.: WO2023/055080
PCT Pub. Date: Apr. 6, 2023

(65) Prior Publication Data
US 2024/0397511 A1 Nov. 28, 2024

(30) Foreign Application Priority Data

Oct. 1, 2021 (KR) ........................ 10-2021-0130678
Oct. 8, 2021 (KR) ........................ 10-2021-0134258

(51) Int. Cl.
H04W 72/1268 (2023.01)
H04L 1/1812 (2023.01)
H04L 1/1867 (2023.01)

(52) U.S. Cl.
CPC ....... *H04W 72/1268* (2013.01); *H04L 1/1812* (2013.01); *H04L 1/1887* (2013.01)

(58) Field of Classification Search
CPC .. H04W 72/569; H04W 72/04; H04L 1/1887; H04L 1/1822; H04L 1/1883; H04L 1/1861
See application file for complete search history.

(56) References Cited

U.S. PATENT DOCUMENTS

2020/0351031 A1* 11/2020 Wu ........................ H04L 1/1822
2023/0189323 A1 6/2023 Baek et al.

FOREIGN PATENT DOCUMENTS

WO 2021162412 A1 8/2021
WO WO-2021162627 A1 * 8/2021 ........... H04L 1/1887

OTHER PUBLICATIONS

International Search Report and Written Opinion of the International Searching Authority dated Jan. 13, 2023, in connection with International Application No. PCT/KR2022/014573, 7 pages.
(Continued)

*Primary Examiner* — Mahran Y Abu Roumi

(57) ABSTRACT

The present disclosure relates to a 5G or 6G communication system for supporting a higher data transmission rate. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. Disclosed are a method and apparatus for prioritizing an I-AQR process of a CG resource in a wireless communication system.

12 Claims, 17 Drawing Sheets

(56)         References Cited

OTHER PUBLICATIONS

Nokia et al., "Remaining Issues of URLLC in NR Unlicensed," R2-210802, 3GPP TSG RAN WG2, Meeting #115-e, Aug. 2021, 4 pages.

Lenovo et al., "Further details on enhancements for URLLC in UCE," R2-2107896, 3GPP TSG RAN WG2, Meeting #115-e, Aug. 2021, 7 pages.

Oppo, "Consideration on URLLC over NRU," R2-2107737 3GPP RAN WG2 Meeting #115-e, Aug. 2021, 5 pages.

* cited by examiner

FIG. 9

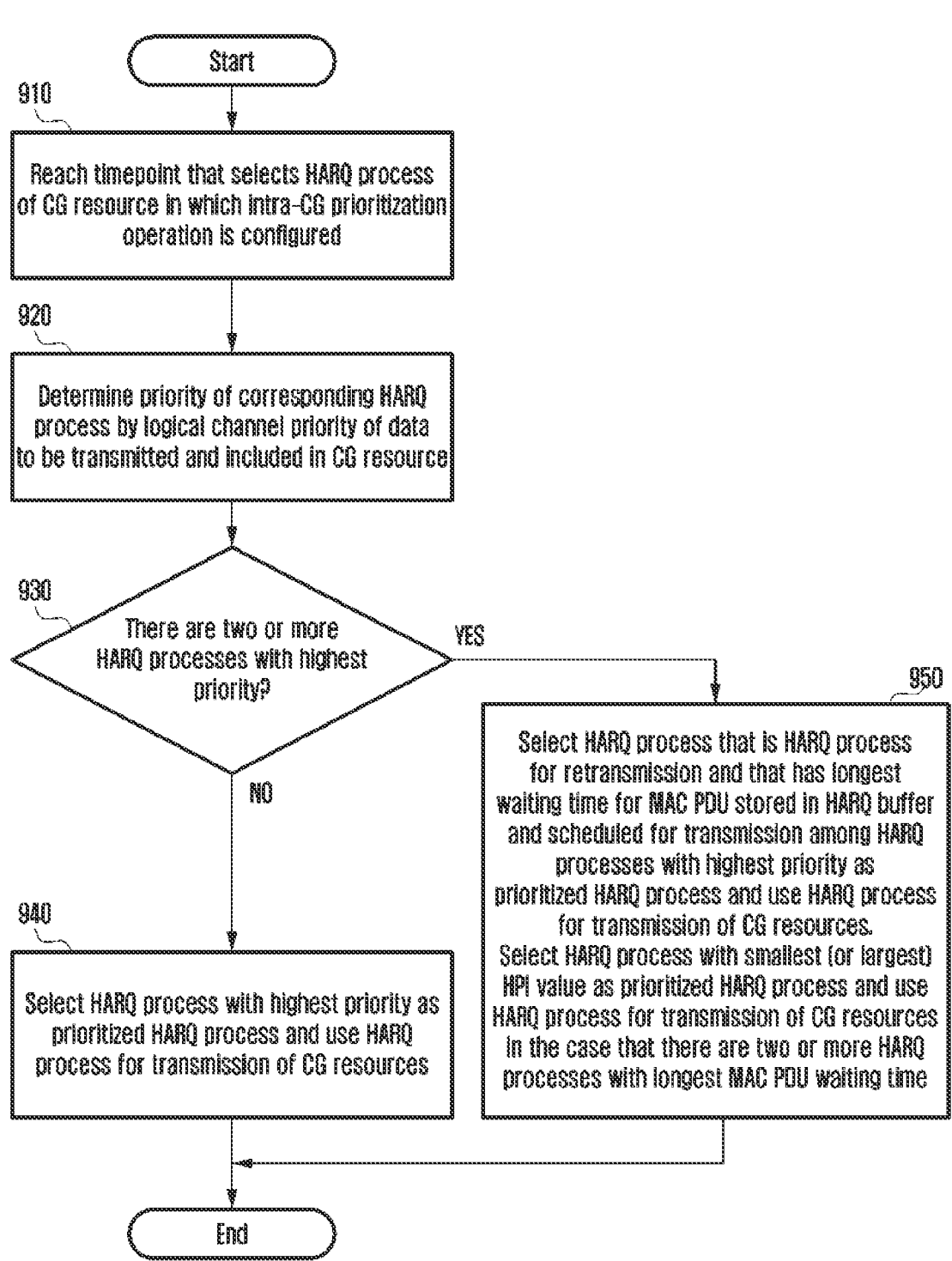

910
Reach timepoint that selects HARQ process
of CG resource in which intra-CG prioritization
operation is configured 920
Determine priority of corresponding HARQ
process by logical channel priority of data
to be transmitted and included in CG resource 930
There are two or more
HARQ processes with highest
priority?

YES

NO

950
Select HARQ process that is HARQ process
for retransmission and that has longest
waiting time for MAC PDU stored in HARQ buffer
and scheduled for transmission among HARQ
processes with highest priority as
prioritized HARQ process and use HARQ process
for transmission of CG resources.
Select HARQ process with smallest (or largest)
HPI value as prioritized HARQ process and use
HARQ process for transmission of CG resources
in the case that there are two or more HARQ
processes with longest MAC PDU waiting time 940
Select HARQ process with highest priority as
prioritized HARQ process and use HARQ
process for transmission of CG resources Start End

Figure 11:
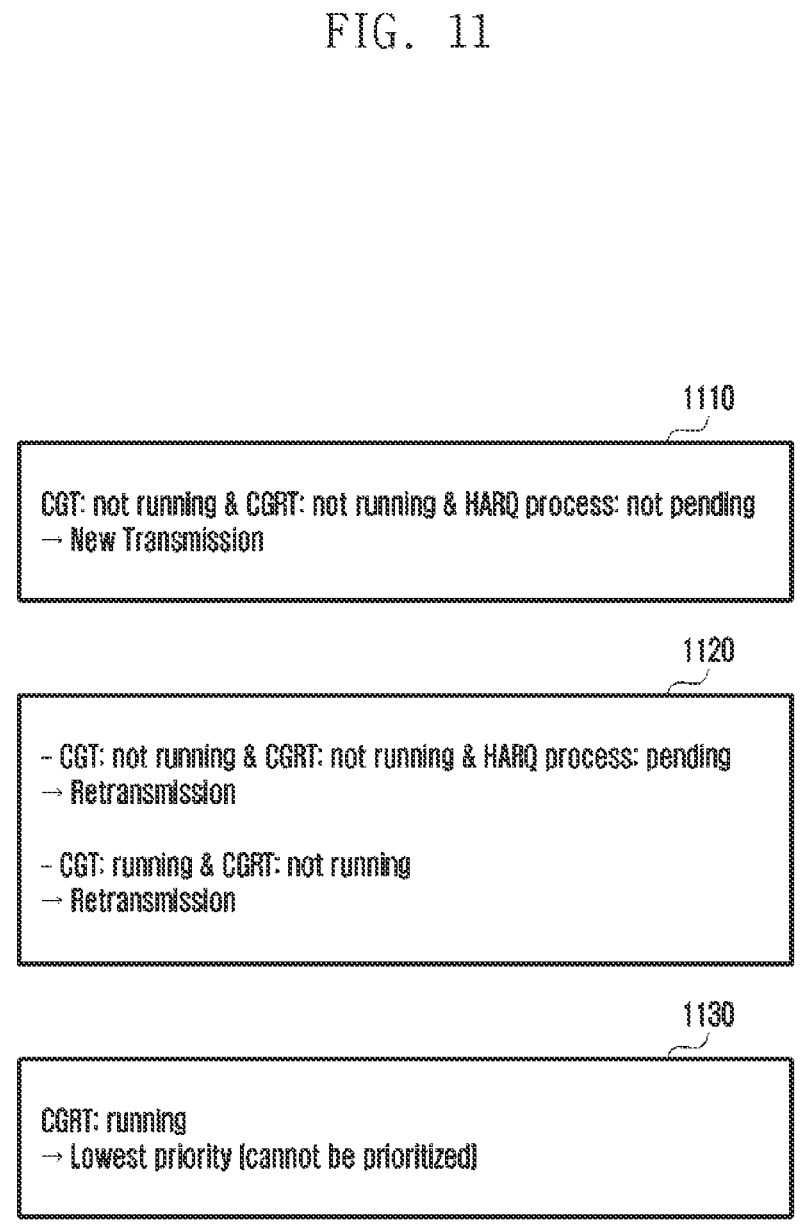

CGT: not running & CGRT: not running & HARQ process: not pending
→ New Transmission

1120

- CGT: not running & CGRT: not running & HARQ process: pending
→ Retransmission

- CGT: running & CGRT: not running
→ Retransmission

1130

CGRT: running
→ Lowest priority (cannot be prioritized)

METHOD AND APPARATUS FOR PRIORITIZATION INSIDE CONFIGURED GRANT

TECHNICAL FIELD

The disclosure relates to a method and device for prioritizing a HARQ process of CG resources in a wireless communication system.

BACKGROUND ART 5G mobile communication technology defines a wide frequency band to enable a fast transmission speed and new services, and may be implemented not only in a frequency ('sub 6 GHz') band of 6 GHz or less such as 3.5 GHz, but also in an ultra high frequency band ('above 6 GHz') called a mmWave such as 28 GHz and 39 GHz. Further, in the case of 6G mobile communication technology, which is referred to as a beyond 5G system, in order to achieve a transmission speed that is 50 times faster than that of 5G mobile communication technology and ultra-low latency reduced to $\frac{1}{10}$ compared to that of 5G mobile communication technology, implementations in terahertz bands (e.g., such as 95 GHz to 3 terahertz (3 THz) band) are being considered.

In the early days of 5G mobile communication technology, with the goal of satisfying the service support and performance requirements for an enhanced mobile broadband (eMBB), ultra-reliable low-latency communications (URLLC), and massive machine-type communications (mMTC), standardization has been carried out for beamforming and massive MIMO for mitigating a path loss of radio waves in an ultra-high frequency band and increasing a propagation distance of radio waves, support for various numerologies (multiple subcarrier spacing operation, and the like) for efficient use of ultra-high frequency resources and dynamic operation for slot formats, initial access technology for supporting multi-beam transmission and broadband, a definition and operation of a band-width part (BWP), a new channel coding method such as low density parity check (LDPC) code for large capacity data transmission and polar code for high reliable transmission of control information, L2 pre-processing, and network slicing that provides a dedicated network specialized for specific services.

Currently, discussions are ongoing to improve initial 5G mobile communication technology and enhance a performance thereof in consideration of services that 5G mobile communication technology was intended to support, and physical layer standardization for technologies such as vehicle-to-everything (V2X) for helping driving determination of an autonomous vehicle and increasing user convenience based on a location and status information of the vehicle transmitted by the vehicle, new radio unlicensed (NR-U) for the purpose of a system operation that meets various regulatory requirements in unlicensed bands, NR UE power saving, a non-terrestrial network (NTN), which is direct UE-satellite communication for securing coverage in areas where communication with a terrestrial network is impossible, and positioning is in progress.

Further, standardization in the field of air interface architecture/protocol for technologies such as industrial Internet of things (IIoT) for supporting new services through linkage and convergence with other industries, integrated access and backhaul (IAB) that provides nodes for expanding network service areas by integrating wireless backhaul links and access links, mobility enhancement including conditional handover and dual active protocol stack (DAPS) handover, and 2-step RACH for NR that simplifies a random access procedure is also in progress, and standardization in the field of system architecture/service for 5G baseline architecture (e.g., service based architecture, service based interface) for applying network functions virtualization (NFV) and software-defined networking (SDN) technologies, mobile edge computing (MEC) that receives services based on a location of a UE, and the like is also in progress.

When such a 5G mobile communication system is commercialized, connected devices in an explosive increase trend will be connected to communication networks; thus, it is expected that function and performance enhancement of a 5G mobile communication system and integrated operation of connected devices will be required. To this end, new research on eXtended reality (XR) for efficiently supporting augmented reality (AR), virtual reality (VR), mixed reality (MR), and the like, 5G performance improvement and complexity reduction using artificial intelligence (AI) and machine learning (ML), AI service support, metaverse service support, and drone communication will be conducted.

Further, the development of such a 5G mobile communication system will be the basis for the development of full duplex technology for improving frequency efficiency and system network of 6G mobile communication technology, satellite, AI-based communication technology that utilizes artificial intelligence (AI) from a design stage and that realizes system optimization by internalizing end-to-end AI support functions, and next generation distributed computing technology that realizes complex services beyond the limits of UE computing capabilities by utilizing ultra-high-performance communication and computing resources as well as a new waveform for ensuring coverage in a terahertz band of 6G mobile communication technology, full dimensional MIMO (FD-MIMO), multi-antenna transmission technologies such as an array antenna and large scale antenna, metamaterial-based lenses and antennas for improving coverage of terahertz band signals, high-dimensional spatial multiplexing technology using orbital angular momentum (OAM), and reconfigurable intelligent surface (RIS) technology. In a 5th generation (5G) mobile communication system, ultra-reliable and low-latency communications (URLLC) having strict service requirements are considered as a major scenario, and various technologies are required for such URLLC.

DISCLOSURE OF INVENTION

Technical Problem

The disclosure provides a method of performing URLLC transmission using configured grant (CG) resources.

The disclosure provides further provides a method of prioritizing a resource to be used for transmission among a plurality of configured grant (CG) resources.

Solution to Problem

According to the disclosure for solving the above problems, a method performed by a terminal in an unlicensed band of a wireless communication system may include receiving, from a base station, configured grant (CG) configuration information including configuration information on intra-CG prioritization through a radio resource control (RRC) message; selecting a HARQ process ID with the highest priority among at least one hybrid automatic repeat and request (HARQ) process ID; and transmitting, to the base station, a medium access control protocol data unit (MAC PDU) corresponding to the selected HARQ process ID through a CG resource determined based on the CG configuration information.

According to another embodiments of the disclosure, a method performed by a base station in an unlicensed band of a wireless communication system may include transmitting, to a terminal, configured grant (CG) configuration information including configuration information on intra-CG prioritization through a radio resource control (RRC) message; and receiving, from the terminal, a medium access control protocol data unit (MAC PDU) through a CG resource determined based on the CG configuration information, wherein the MAC PDU may be a MAC PDU corresponding to a HARQ process ID with the highest priority among at least one hybrid automatic repeat and request (HARQ) process ID selected by the terminal.

According to another embodiments of the disclosure, a terminal in an unlicensed band of a wireless communication system may include a transceiver; and a controller, wherein the controller may be configured to receive, from a base station, configured grant (CG) configuration information including configuration information on intra-CG prioritization through a radio resource control (RRC) message, to select a HARQ process ID with the highest priority among at least one hybrid automatic repeat and request (HARQ) process ID, and to transmit, to the base station, a medium access control protocol data unit (MAC PDU) corresponding to the selected HARQ process ID through a CG resource determined based on the CG configuration information.

According to another embodiments of the disclosure, a base station in an unlicensed band of a wireless communication system may include a transceiver; and a controller, wherein the controller may be configured to transmit, to a terminal, configured grant (CG) configuration information including configuration information on intra-CG prioritization through a radio resource control (RRC) message, and to receive, from the terminal, a medium access control protocol data unit (MAC PDU) through a CG resource determined based on the CG configuration information, wherein the MAC PDU may be a MAC PDU corresponding to a HARQ process ID with the highest priority among at least one hybrid automatic repeat and request (HARQ) process ID selected by the terminal.

Advantageous Effects of Invention

According to an embodiment of the disclosure, requirements of URLLC communication can be satisfied by prioritizing and selecting a HARQ process of appropriate CG resources based on whether a timer is running, a data storage status in a buffer, and the like.

BRIEF DESCRIPTION OF DRAWINGS

FIG. 9 is a flowchart illustrating a detailed operation of intra-CG prioritization according to an embodiment of the disclosure.

FIG. 11 is a diagram illustrating initial transmission and retransmission determination operations of a configured grant according to an embodiment of the disclosure.

MODE FOR THE INVENTION

Figure 1:
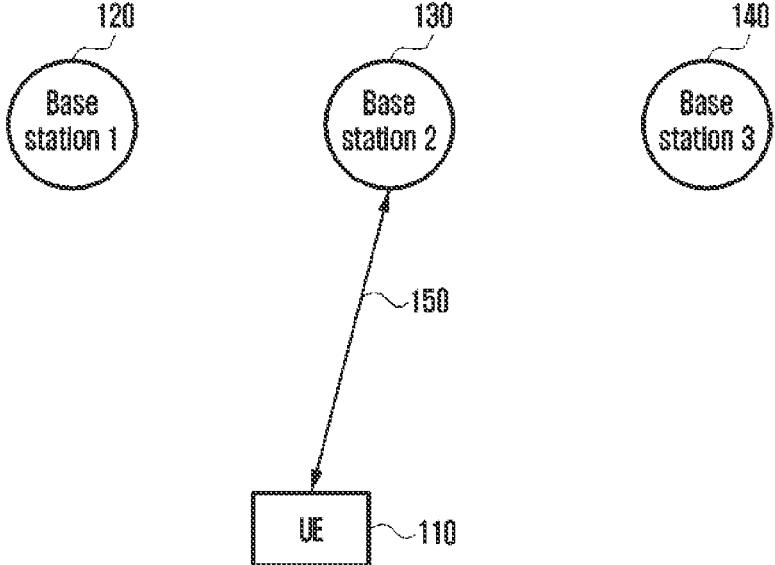
FIG. 1 is a diagram illustrating a connection method between a terminal and a base station in a mobile communication system according to an embodiment of the disclosure.

Hereinafter, embodiments of the disclosure will be described in detail with the accompanying drawings. Further, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In the following description, in describing the disclosure, in the case that it is determined that a detailed description of a related well-known function or constitution may unnecessarily obscure the gist of the disclosure, a detailed description thereof will be omitted. Hereinafter, embodiments of the disclosure will be described with reference to the attached drawings.

FIG. 1 is a diagram illustrating a connection method between a UE and a base station in a mobile communication system according to an embodiment of the disclosure.

A user equipment (UE) 110, which is a component in a mobile communication system, is a communication device owned by a user who receives communication services, and may perform wireless communication through connection to one or more base stations 120, 130, and 140. The embodiment of FIG. 1 illustrates an example in which the UE is positioned in the coverage of the base station 2, 130 to have a radio resource control (RRC) connection with the base station 2 (150).

In a mobile communication system, the UE may move to the coverage of another base station due to mobility thereof, and in this case, a process of changing the connection to another base station is referred to as handover. A frequency band used by the base station may be a licensed band in which a communication service provider leases and uses a frequency, or an unlicensed band that may be used without permission. In the case of wireless communication in an unlicensed band, a listen before talk (LBT) operation should be performed to coexist with other communication systems or services that use other radio waves. Further, transmission for wireless communication may conflict with other communication systems or other services that use radio waves, and in this case, successful transmission may not be performed. Wireless communication protocols in unlicensed bands should be designed considering characteristics of these unlicensed bands. In a 5th generation (5G) mobile communication system, ultra-reliable and low-latency communications (URLLC) having strict service requirements are considered a major scenario, and various technologies are required for such URLLC.

Figure 2:
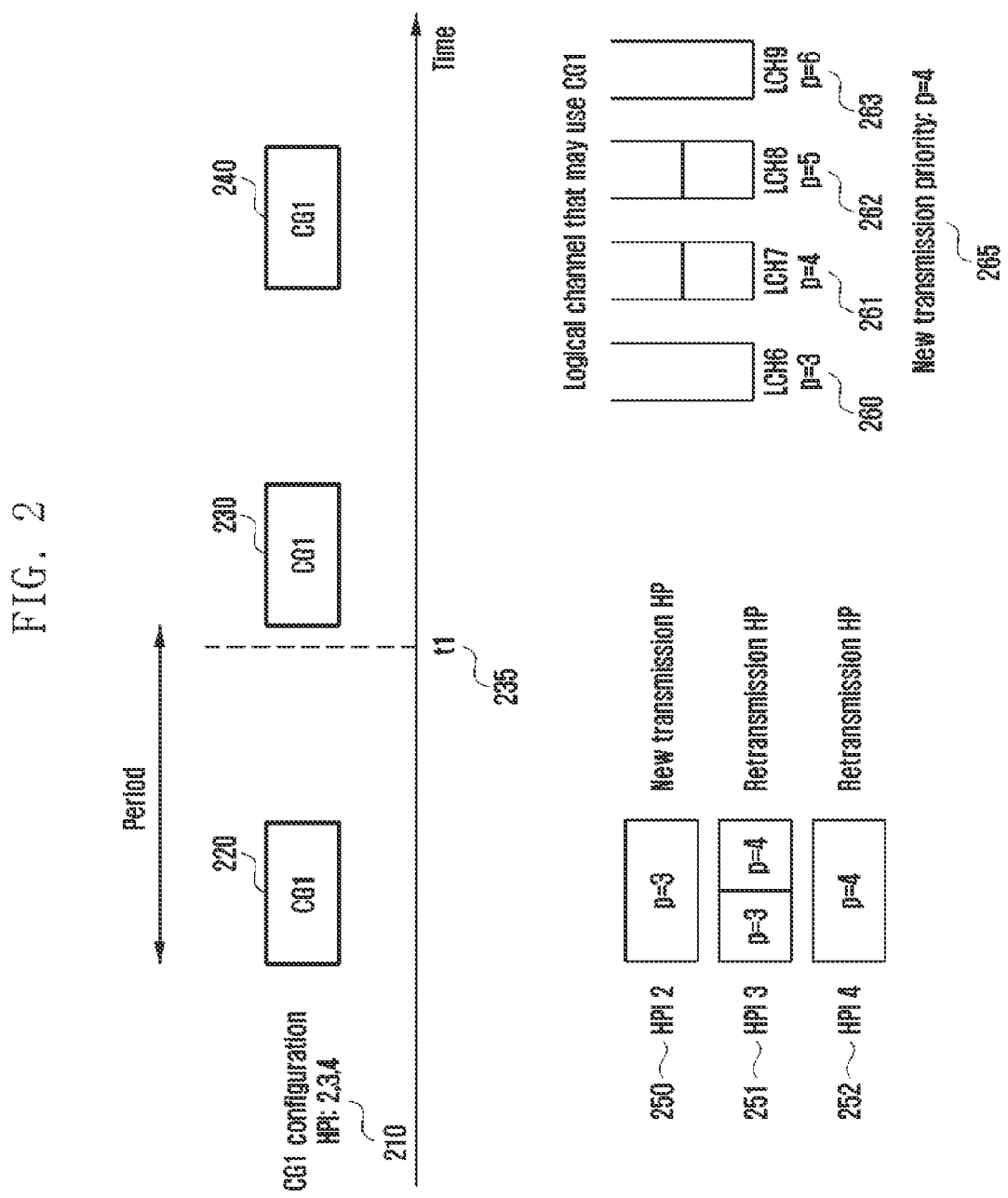
FIG. 2 is a diagram illustrating an intra-CG prioritization operation according to an embodiment of the disclosure.

FIG. 2 is a diagram illustrating an intra-CG prioritization operation according to an embodiment of the disclosure In order to satisfy strict latency requirements of URLLC communication, an uplink communication system in which the UE transmits to the base station may configure a periodic configured grant (CG) resource, and in the case that a data packet to be transmitted to the UE occurs, the uplink communication system may enable an adjacent CG resource to perform immediate transmission of the data packet. The embodiment of FIG. 2 represents that a periodic CG resource (first CG resource) 220, 230, or 240 is configured to transmit a specific URLLC data packet.

CG resources may be configured by an RRC reconfiguration message sent by the base station to the UE, and each CG resource may be configured by an available hybrid automatic repeat request (HARQ) process. The HARQ process of the UE may be identified by a HARQ process ID (HPI), and one HARQ process within a cell corresponds to one HPI. In the embodiment of FIG. 2, a HARQ process configured in a first CG resource indicates that the HARQ process has HPIs of 2, 3, and 4 (210). When one CG resource is transmitted, a medium access control protocol data unit (MAC PDU) generated using one HARQ process may be transmitted. According to the embodiment, the MAC PDU may be referred to as a transport block (TB). Which HARQ process each CG resource uses may be determined by a logical channel (LCH) priority of data to be included in the UE. A timepoint that determines which HARQ process to use may be a timepoint (timepoint t1) 235 before CG resources are used considering a processing time of the UE.

A HARQ process used at the timepoint may be a HARQ process with the highest logical channel priority of data that may be transmitted through the HARQ process. To this end, the priority of the HARQ process may be determined and the HARQ process with the highest priority may be selected and transmitted. In order to determine a HARQ process to be used for transmission using the first CG resource 230 at the timepoint t1, a priority of data that may be transmitted in an HARQ buffer of an available HARQ process may be identified. In the case that a cg-RetransmissionTimer (CGRT) is configured, in the CG resources 220, 230, and 240, not only new transmission but also retransmission of an already generated MAC PDU may be performed. Whether to perform new transmission or retransmission may be determined as follows according to whether a ConfiguredGrantTimer (CGT) is running, whether the CGRT is running, and whether the HARQ process is pending.

a. In the case that the CGT is not running and that the CGRT is not running and that the HARQ process is not a pending process, the HARQ process may be used for new transmission.

b. In the case that the CGT is not running and that the CGRT is not running and that the HARQ process is a pending process, the HARQ process may be used for retransmission.

c. In the case that the CGT is running and that the CGRT is not running, the HARQ process may be used for retransmission.

d. In the case that the CGRT is running, the HARQ process may not be used for transmission of CG resources.

In the embodiment of FIG. 2, it is assumed that a HARQ process 250 is used for new transmission according to the above conditions in the case that the HARQ process 250 of HPI2 is selected at the timepoint t1 and that the HARQ process is used for retransmission according to the above conditions in the case that a HARQ process of HPI3, 251 or HPI4, 252 is selected. In the case of a HARQ process used for new transmission, as in the HARQ process 250 of HPI2, because a new MAC PDU is obtained and is used for transmission regardless of data of the MAC PDU currently stored in the HARQ buffer of the HARQ process, among logical channels that may use the CG resource, the highest priority of a logical channel with available data may be a priority of the HARQ process. A logical channel priority of data stored in the HARQ buffer of the HARQ process of HPI2 at the timepoint t1 is 3, but because the data will not be transmitted, the data does not affect a priority of the HARQ process. However, among logical channels LCH6, 260, LCH7, 261, LCH8, 262, and LCH9, 263 that may use a resource of CG1, 4, which is a priority of LCH7 with a high priority (p=4) among LCH7, 261 and LCH8, 262, which are logical channels with available data may be determined as a priority of new transmission (265). Therefore, a priority of a HARQ process of HPI2 may be 4, which is a priority of new transmission. Here, a priority value may be configured to a number greater than 0, and smaller numbers may mean a higher priority.

In the case of a HARQ process used for retransmission, as in the HARQ process 251, 252 of HPI3 or HPI4, a MAC PDU currently stored in the HARQ buffer of the HARQ process is retransmitted; thus, a priority of the HARQ process may be determined to a highest priority value among priorities of data multiplexed and included in the stored MAC PDU. Because the highest priority of data stored in the HARQ buffer of the HARQ process 251 of HPI3 is 3, a priority of the HARQ process of HPI3 may be 3. Because the highest priority of data stored in the HARQ buffer of the HARQ process 252 of HPI4 is 4, a priority of the HARQ process of HPI4 may be 4. Because the highest priority among HARQ process priorities that may be used for transmission of the CG resource 230 is 3, which is a priority of the HARQ process of HPI3, the MAC device of the UE may select a HARQ process of HPI3 to perform transmission. The priority of the HARQ process may be a priority value of the CG resource to be transmitted when the HARQ process is selected. A method of selecting a HARQ process based on a priority when transmitting one CG resource may be referred to as configured grant internal prioritization or intra-CG prioritization. An intra-CG prioritization operation may be selectively configured by the base station to the UE in consideration of the capability of the supported UE. In an embodiment, a method of selecting a HARQ process may be to select a HARQ process that maximizes a priority of an uplink grant of the configured grant. This may have the same effect as selecting a HARQ process with the highest priority among HARQ processes in the embodiment of FIG. 2.

Figure 3:
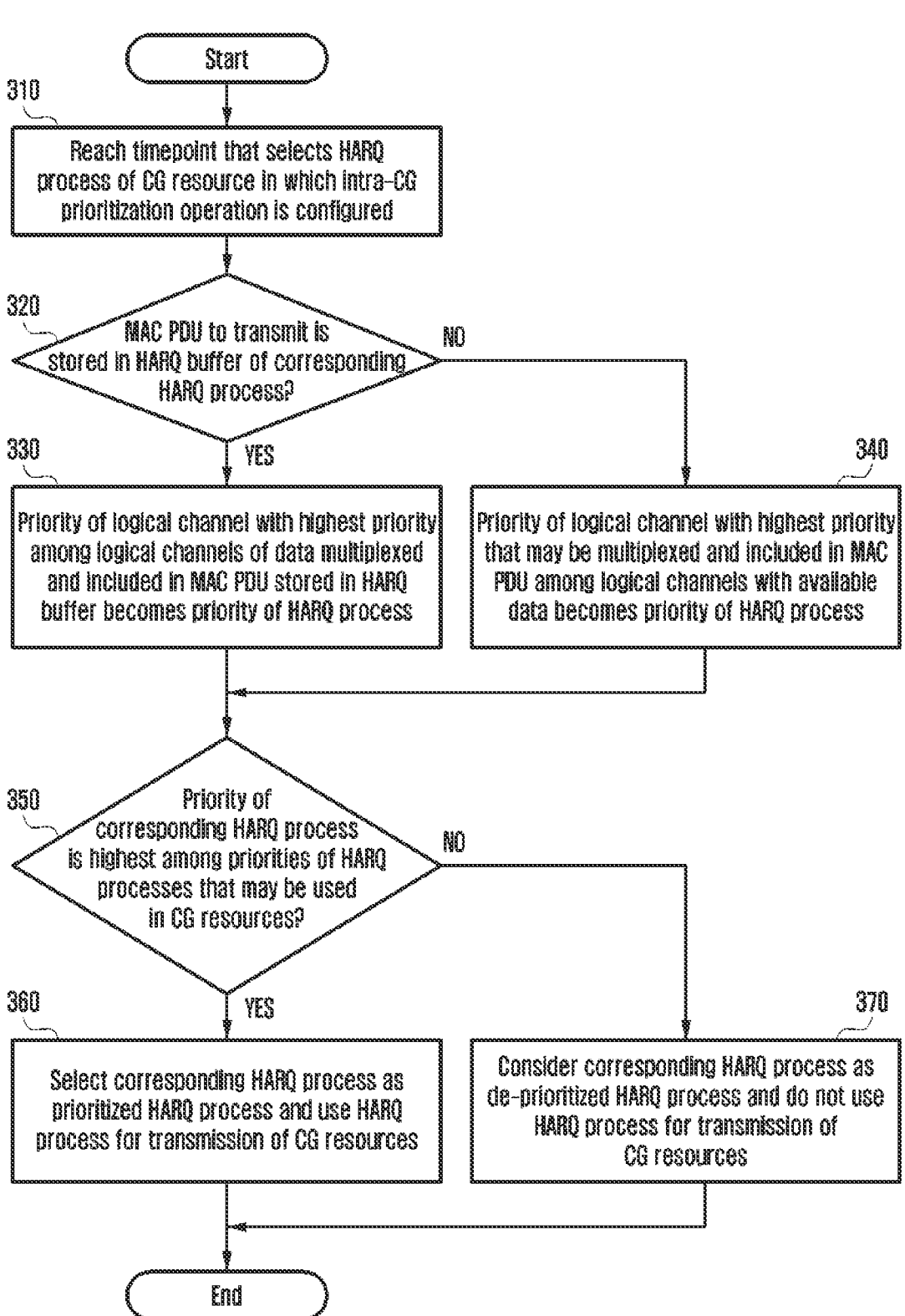
FIG. 3 is a flowchart illustrating an HARQ process internal operation when performing intra-CG prioritization according to an embodiment of the disclosure.

In the embodiment of FIG. 2, because the HARQ process of HPI2 becomes a HARQ process that performs new transmission, a logical channel priority of data stored in the HARQ buffer is 3, but because the data will not be transmitted, the data does not affect the priority of the HARQ process. However, among LCH7, 261 and LCH8, 262, which are logical channels with available data among logical channels LCH6, 260, LCH7, 261, LCH8, 262, and LCH9, 263 that may use the resource of CG1, 4, which is a priority of LCH7 with a high priority (p=4) becomes an uplink grant priority of CG1 when a HARQ process of HPI2 is selected; thus, 4 may be determined as a priority of the HARQ process of HPI2 (265). In the case of a HARQ process used for retransmission, as in the HARQ process 251 or 252 of HPI3 or HPI4, because the MAC PDU currently stored in the HARQ buffer of the HARQ process is retransmitted, a higher priority value among priorities of data multiplexed and included in the stored MAC PDU becomes the uplink grant priority of CG1 when the HARQ process is selected. Therefore, because the highest priority of data stored in the HARQ buffer of the HARQ process 251 of HPI3 is 3, a priority of the HARQ process of HPI3 may be 3. Because the highest priority of data stored in the HARQ buffer of a HARQ process 252 of HPI4 is 4, a priority of the HARQ process of HPI4 may be 4. When a HARQ process is selected, the MAC device may select a HARQ process of HPI3 that makes (maximizes) the uplink radio resource priority of CG1 the highest and use the HARQ process for transmission. FIG. 3 is a flowchart illustrating an HARQ process internal operation when performing intra-CG prioritization according to an embodiment of the disclosure.

In the embodiment of FIG. 3, it is assumed that a timepoint that should select a HARQ process has reached for a CG resource in which an intra-CG prioritization operation is configured (310). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. In this case, the priority of the HARQ process may vary according to whether a MAC PDU to transmit when each HARQ process is selected is stored in the HARQ buffer of the HARQ process (320). In other words, when each HARQ process is selected, the priority of the HARQ process may vary according to whether transmission using the HARQ process is new transmission or retransmission. If a MAC PDU to transmit is stored in the HARQ buffer of the HARQ process, that is, if transmission using the HARQ process is retransmission, a priority of a logical channel with the highest priority among logical channels of data multiplexed and included in the MAC PDU stored in the HARQ buffer may be a priority of the HARQ process (330). If the MAC PDU to transmit is not stored in the HARQ buffer of the HARQ process, that is, if transmission using the HARQ process is new transmission, a priority of a logical channel with the highest priority that may be multiplexed and included in the MAC PDU among logical channels with available data may be a priority of the HARQ process (340).

In order to determine whether to actually select the HARQ process after the priority of the HARQ process that may use the configured grant resource is determined, the MAC device needs to identify whether the priority of the corresponding HARQ process is the highest among priorities of the HARQ process that may use the configured grant resource (350). If the priority of the corresponding HARQ process is the highest among priorities of HARQ processes that may be used in CG resources, the corresponding HARQ process may become a prioritized HARQ process, be selected by the MAC device, and be used for transmission of CG resources (360). Other non-prioritized HARQ processes may become de-prioritized HARQ processes. However, there may not be two or more prioritized HARQ processes at the same timepoint, and if there are two or more HARQ processes with the highest priority among HARQ processes that may use CG resources, the MAC device may select only one HARQ process as a prioritized HARQ process and use the HARQ process for transmission of CG resources.

In an embodiment, a method of selecting a HARQ process may be to select a HARQ process that maximizes an uplink grant priority of the configured grant. This may have the same effect as selecting the HARQ process as a prioritized HARQ process in the case that the corresponding HARQ process has the highest priority in steps 350 and 360.

A method of selecting one HARQ process as a prioritized HARQ process may be at least one of methods described with reference to FIGS. 5, 6, 7, 8, and 9. In step 350, when a priority of the corresponding HARQ process is not the highest among priorities of HARQ processes that may be used in CG resources, the HARQ process may not be selected for transmission of the CG resource. Therefore, in order not to use the HARQ process for transmission, the corresponding HARQ process may be considered as a de-prioritized HARQ process; thus, the HARQ process may not be used for transmission of CG resources (370).

Figure 4:
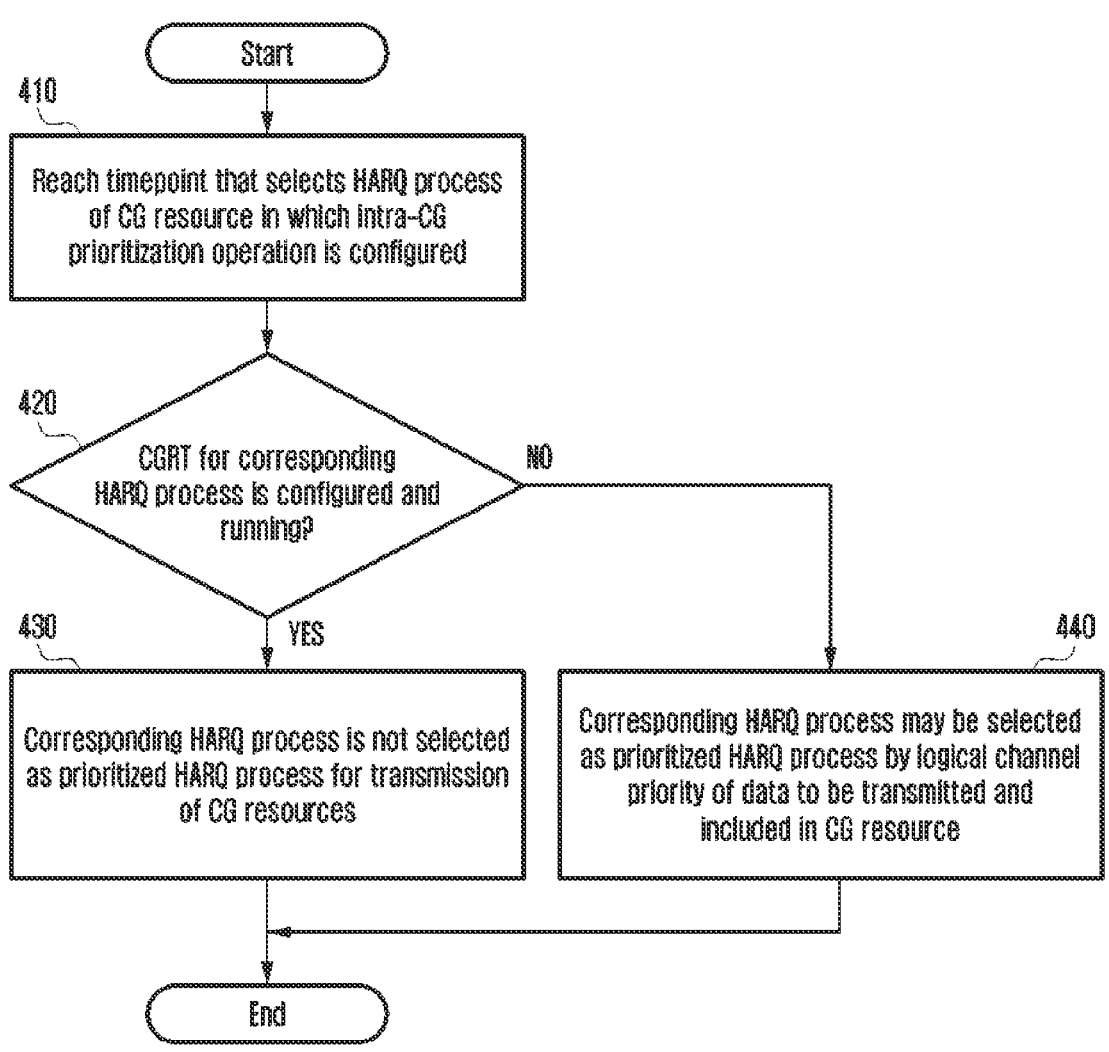
FIG. 4 is a flowchart illustrating an operation considered as a CGRT operation when performing intra-CG prioritization according to an embodiment of the disclosure.

FIG. 4 is a flowchart illustrating an operation considered as a CGRT operation when performing intra-CG prioritization according to an embodiment of the disclosure.

A CG-RetransmissionTimer (CGRT) is a timer configured for operation in an unlicensed band and indicating the time it takes for the base station to recognize the transmission after the UE transmits an uplink grant. During a time when the CGRT is running after the UE transmits the configured grant, the UE may not know whether the base station has recognized transmission of the configured grant; thus, the UE performs a waiting operation without performing any more transmission of the CG until the CGRT has expired. If there is no further operation of the base station, such as allocation of retransmission resources, until the CGRT has expired, the UE may assume that the base station did not recognize CG transmission and then perform retransmission of the HARQ process in the configured grant resource. Therefore, even if intra-CG prioritization is configured and the UE should perform an intra-CG prioritization operation, the HARQ process in which the CGRT is running should not be a prioritized HARQ process.

In the embodiment of FIG. 4, it is assumed that a timepoint that should select a HARQ process has reached for a CG resource in which an intra-CG prioritization operation is configured (410). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. In this case, it may be necessary to identify whether the CGRT for each HARQ process is running (420).

If the CGRT for the corresponding HARQ process is configured and running, new transmission or retransmission should not be performed because the corresponding HARQ process is a HARQ process currently performing transmission. Accordingly, the corresponding HARQ process may be excluded from an operation of being selected as a prioritized HARQ process for transmission of CG resources and may not be selected as a prioritized HARQ process (430). According to the embodiment, step 430 may prevent selection of the HARQ process by considering the corresponding HARQ process as an unavailable HARQ process (i.e., considering as an unavailable HARQ process). If the CGRT for the corresponding HARQ process is not running, the corresponding HARQ process may be selected as a prioritized HARQ process by a logical channel priority of data to be transmitted and included in the CG resource to be used for transmission of the CG resource or to be a de-prioritized HARQ process; thus transmission may not be performed (440). A method of selecting a HARQ process based on the HARQ process priority may follow the method illustrated in embodiments such as FIGS. 3, 5, 6, 7, 8, and 9.

Figure 5:
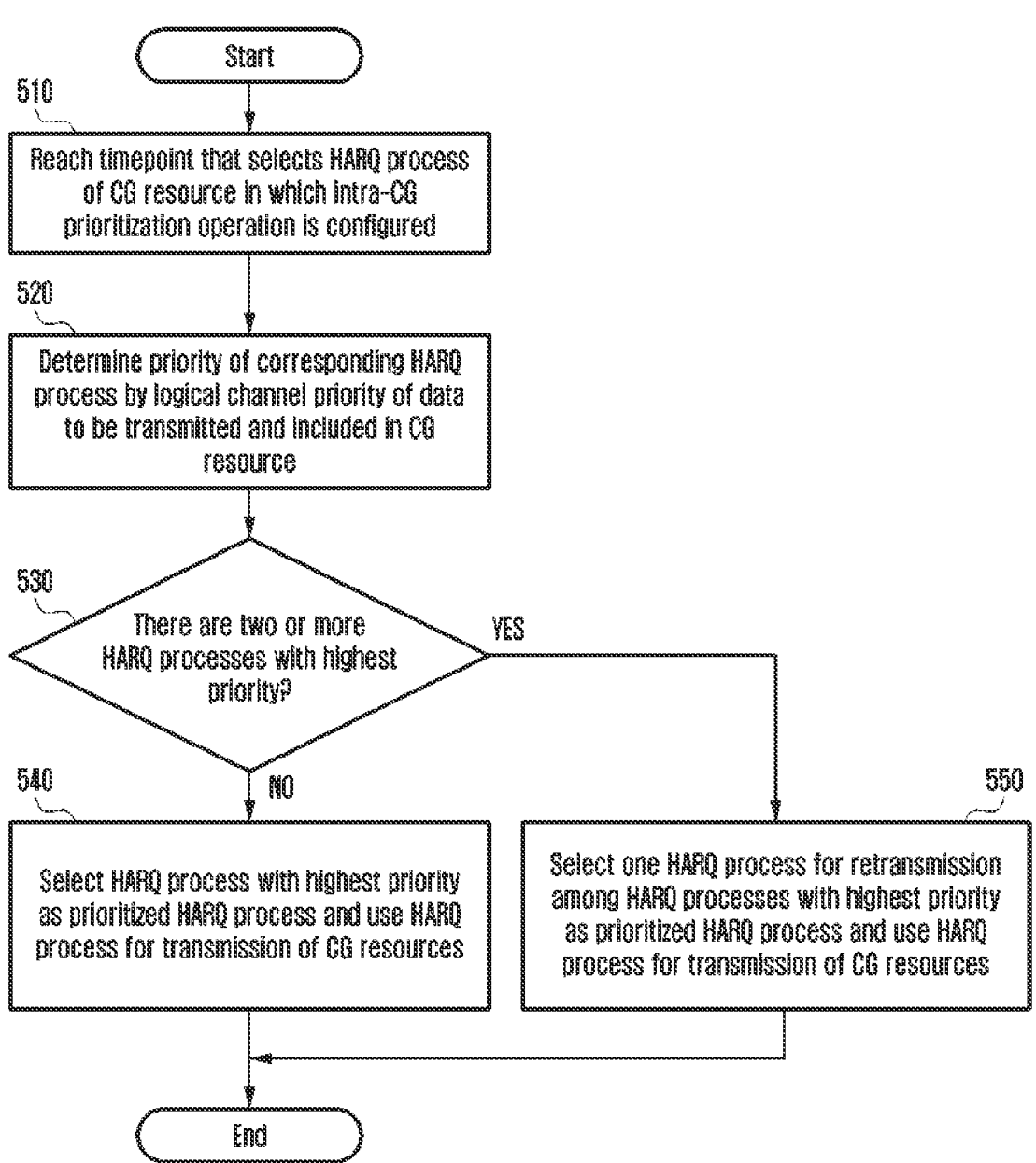
FIG. 5 is a flowchart illustrating a detailed operation of intra-CG prioritization according to an embodiment of the disclosure.

FIG. 5 is a flowchart illustrating a detailed operation of intra-CG prioritization according to an embodiment of the disclosure.

In the embodiment of FIG. 5, it is assumed that a timepoint that should select a HARQ process has reached for a CG resource in which an intra-CG prioritization operation is configured (510). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. As described with reference to FIG. 3, this may be configured differently according to whether to perform new transmission or retransmission when the HARQ process is selected. In other words, this may be configured differently according to whether the transmission is transmission performed by acquiring a new MAC PDU without using the MAC PDU stored in the HARQ buffer or transmission using the MAC PDU stored in the HARQ buffer. That is, the MAC device may determine a priority of the corresponding HARQ process by a logical channel priority that may be multiplexed and included in a data MAC PDU to be transmitted and included in the CG resource or that is multiplexed and included in the MAC PDU (520).

As already described with reference to FIG. 3, the MAC device may select a HARQ process with the highest priority and use the HARQ process for transmission of CG resources, but in the case that there are two or more HARQ processes with the highest priority, the MAC device needs to select only one HARQ process and use the HARQ process for CG transmission. If there are not two or more HARQ processes with the highest priority (if there are not two or more HARQ processes with the highest priority of an uplink grant when used for CG transmission) (530), there is at most one HARQ process with the highest priority; thus, the MAC device may select a HARQ process with the highest priority as a prioritized HARQ process and use the HARQ process for transmission of CG resources (540). Other non-prioritized HARQ processes may become de-prioritized HARQ processes.

If there are two or more HARQ processes with the highest priority (if there are two or more HARQ processes with the highest priority of an uplink grant when used for CG transmission) in step 530, the MAC device may select one HARQ process for retransmission among HARQ processes with the highest priority as a prioritized HARQ process and use the HARQ process for selecting CG resources (550). This is because, even if the priority of HARQ process is the same, the priority of the MAC PDU that should perform retransmission is high; thus, it is effective for URLLC transmission to more preferentially process retransmission.

In an embodiment, in step 530, the MAC device may identify whether there are two or more HARQ processes that maximize an uplink grant priority of the configured grant. In the case that there are two or more HARQ processes that maximize an uplink grant priority of the configured grant in step 530, in step 550, the MAC device may select one HARQ process for retransmission among HARQ processes that maximize an uplink grant priority of the configured grant as a prioritized HARQ process and use the HARQ process for transmission of the configured grant.

Figure 6:
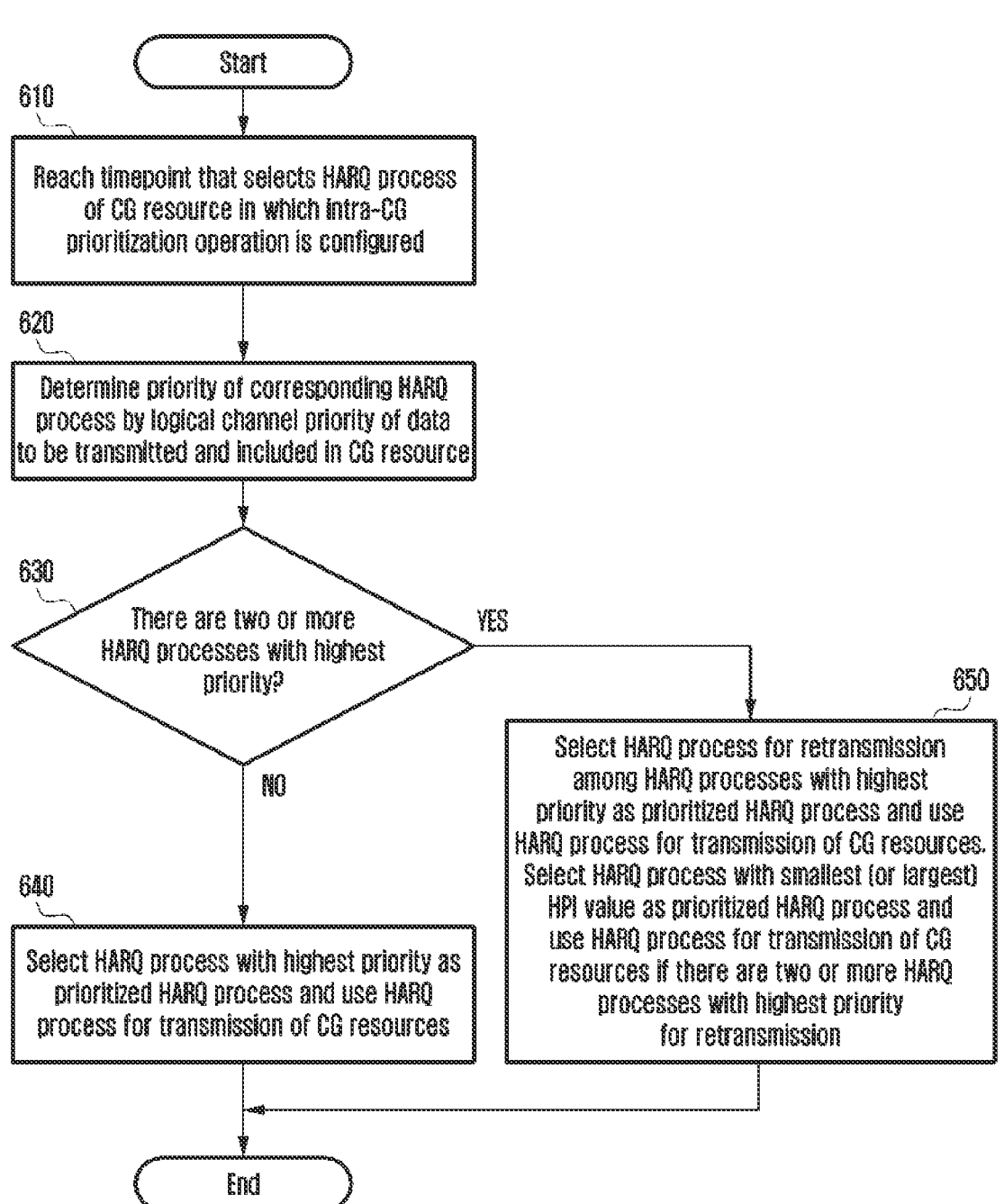
FIG. 6 is a flowchart illustrating a detailed operation of intra-CG prioritization according to an embodiment of the disclosure.

FIG. 6 is a flowchart illustrating a detailed operation of intra-CG prioritization according to an embodiment of the disclosure.

In the embodiment of FIG. 6, it is assumed that a timepoint that should select a HARQ process has reached for a CG resource in which an intra-CG prioritization operation is configured (610). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. As described with reference to FIG. 3, this may be configured differently according to whether to perform new transmission or retransmission when the HARQ process is selected. In other words, this may be configured differently according to whether the transmission is transmission performed by acquiring a new MAC PDU without using the MAC PDU stored in the HARQ buffer or transmission using the MAC PDU stored in the HARQ buffer. That is, the MAC device may determine a priority of the corresponding HARQ process by a logical channel priority that may be multiplexed and included in a data MAC PDU to be transmitted and included in the CG resource or that is multiplexed and included in the MAC PDU (620).

As already described with reference to FIG. 3, the MAC device may select a HARQ process with the highest priority and use the HARQ process for transmission of CG resources, but in the case that there are two or more HARQ processes with the highest priority, the MAC device needs to select only one HARQ process and use the HARQ process for CG transmission. If there are not two or more HARQ processes with the highest priority (if there are not two or more HARQ processes with the highest priority of an uplink grant when used for CG transmission) (630), there is at most one HARQ process with the highest priority; thus, the MAC device may select a HARQ process with the highest priority as a prioritized HARQ process and use the HARQ process for transmission of CG resources (640). Other non-prioritized HARQ processes may become de-prioritized HARQ processes.

If there are two or more HARQ processes with the highest priority (if there are two or more HARQ processes with the highest priority of an uplink grant when used for CG transmission) in step 630, the MAC device may select a HARQ process for retransmission among HARQ processes with the highest priority as a prioritized HARQ process and use the HARQ process for selecting CG resources. However, if there are two or more HARQ processes with the highest priority for retransmission, the MAC device may select a HARQ process with the smallest HARQ process ID (HPI) value (in other embodiments, the largest value may be selected) as a prioritized HARQ process and use the HARQ process for transmission of CG resources (650). This is because, even if the priority of the HARQ process is the same, a priority of a MAC PDU that should perform retransmission is high; thus, it is effective for URLLC transmission to more preferentially process retransmission. Further, a method of selecting the HARQ process based on the HPI may be effective in estimating a HARQ process status of the UE based on the HPI of the CG resource received by the base station.

In an embodiment, in step 630, the MAC device may identify whether there are two or more HARQ processes that maximize an uplink grant priority of the configured grant. In the case that there are two or more HARQ processes that maximize an uplink grant priority of the configured grant in step 630, in step 650, the MAC device may select an HARQ process for retransmission among HARQ processes that maximize an uplink grant priority of the configured grant as a prioritized HARQ process and use the HARQ process for transmission of the configured grant. If there are two or more HARQ processes for retransmission among HARQ processes that maximize an uplink grant priority of the configured grant, the MAC device may select a HARQ process with the smallest HARQ process ID value among HARQ processes as a prioritized HARQ process and use the HARQ process for transmission of the configured grant. In another embodiment, in step 650, the MAC device may select a HARQ process for retransmission among HARQ processes that maximize an uplink grant priority of the configured grant as a prioritized HARQ process and use the HARQ process for transmission of the configured grant. If there are two or more HARQ processes for retransmission among HARQ processes that maximize an uplink grant priority of the configured grant, the MAC device may select a HARQ process with the largest HARQ process ID value among HARQ processes as a prioritized HARQ process and use the HARQ process for transmission of the configured grant.

Figure 7:
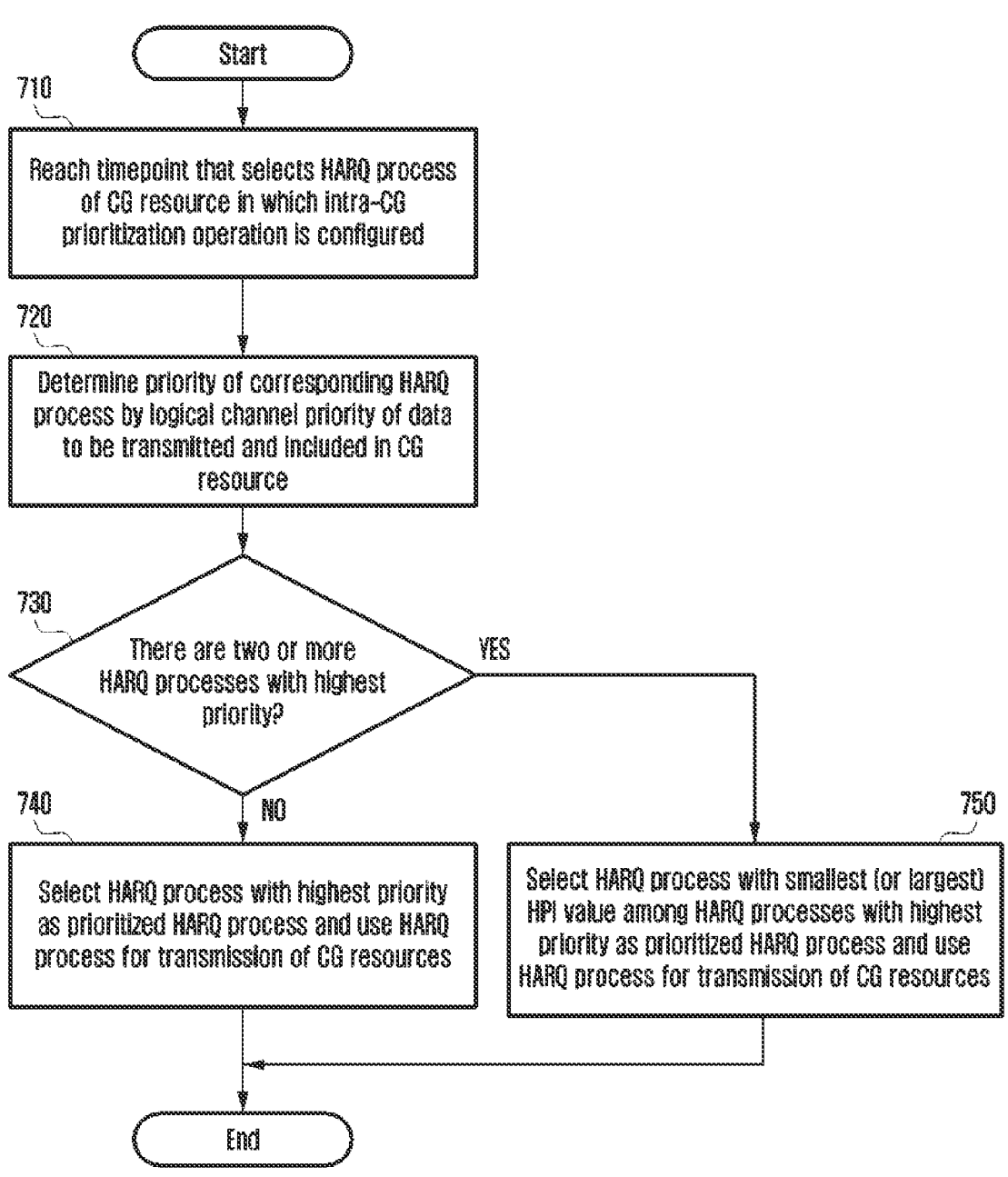
FIG. 7 is a flowchart illustrating a detailed operation of intra-CG prioritization according to an embodiment of the disclosure.

FIG. 7 is a flowchart illustrating a detailed operation of intra-CG prioritization according to an embodiment of the disclosure.

In the embodiment of FIG. 7, it is assumed that a timepoint that should select a HARQ process has reached for a CG resource in which an intra-CG prioritization operation is configured (710). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. As described with reference to FIG. 3, this may be configured differently according to whether to perform new transmission or retransmission when the HARQ process is selected. In other words, this may be configured differently according to whether the transmission is transmission performed by acquiring a new MAC PDU without using an MAC PDU stored in the HARQ buffer or transmission using an MAC PDU stored in the HARQ buffer. That is, the MAC device may determine a priority of the corresponding HARQ process by a logical channel priority that may be multiplexed and included in a data MAC PDU to be transmitted and included in the CG resource or that is multiplexed and included in the MAC PDU (720).

As already described with reference to FIG. 3, the MAC device may select a HARQ process with the highest priority and use the HARQ process for transmission of CG resources, but in the case that there are two or more HARQ processes with the highest priority, the MAC device needs to select only one HARQ process and use the HARQ process for CG transmission. If there are not two or more HARQ processes with the highest priority (if there are not two or more HARQ processes with the highest priority of an uplink grant when used for CG transmission) (730), there is at most one HARQ process with the highest priority; thus, the MAC device may select a HARQ process with the highest priority as a prioritized HARQ process and use the HARQ process for transmission of CG resources (740). Other non-prioritized HARQ processes may become de-prioritized HARQ processes.

If there are two or more HARQ processes with the highest priority (if there are two or more HARQ processes with the highest priority when used for CG transmission) in step 730, the MAC device may select a HARQ process with the smallest HARQ process ID (HPI) value (in another embodiment, the largest value may be selected) among HARQ processes with the highest priority as a prioritized HARQ process and use the HARQ process for transmission of CG resources (750). A method of selecting a HARQ process based on the HPI may be effective in estimating the HARQ process status of the UE based on the HPI of the CG resource received by the base station.

In an embodiment, in step 730, the MAC device may identify whether there are two or more HARQ processes that maximize an uplink grant priority of the configured grant. In the case that there are two or more HARQ processes that maximize an uplink grant priority of the configured grant in step 730, in step 750, the MAC device may select a HARQ process with the smallest HARQ process ID value among HARQ processes that maximize an uplink grant priority of the configured grant as a prioritized HARQ process and use the HARQ process for transmission of the configured grant. In another embodiment, in step 750, the MAC device may select a HARQ process with the largest HARQ process ID value among HARQ processes that maximize an uplink grant priority of the configured grant as a prioritized HARQ process and use the HARQ process for transmission of the configured grant.

Figure 8:
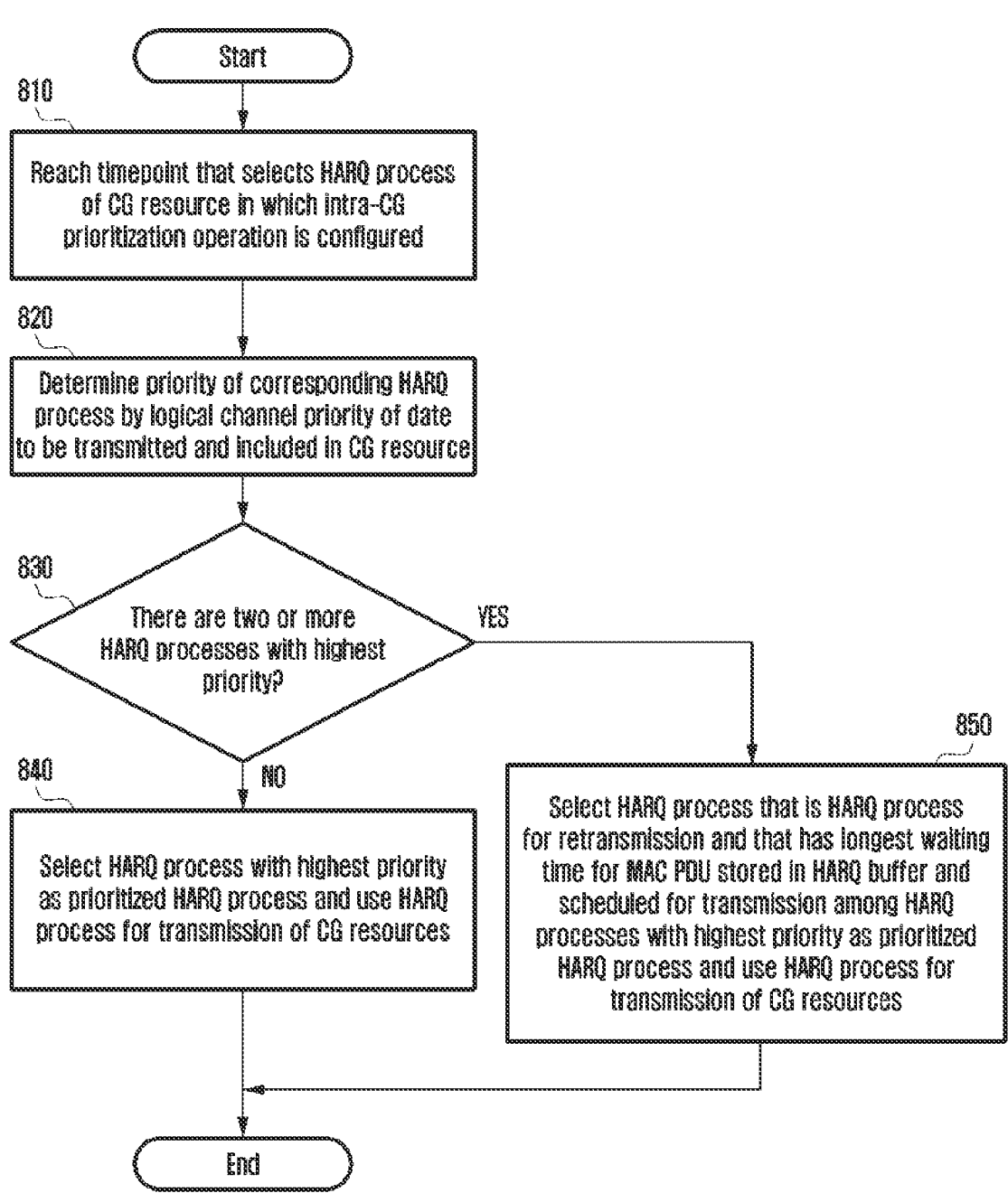
FIG. 8 is a flowchart illustrating a detailed operation of intra-CG prioritization according to an embodiment of the disclosure.

FIG. 8 is a flowchart illustrating a detailed operation of intra-CG prioritization according to an embodiment of the disclosure.

In the embodiment of FIG. 8, it is assumed that a timepoint that should select a HARQ process has reached for a CG resource in which an intra-CG prioritization operation is configured (810). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. As described with reference to FIG. 3, this may be configured differently according to whether to perform new transmission or retransmission when the HARQ process is selected. In other words, the transmission may be configured differently according to whether the transmission is transmission performed by acquiring a new MAC PDU without using the MAC PDU stored in the HARQ buffer or transmission using the MAC PDU stored in the HARQ buffer. That is, the MAC device may determine a priority of the corresponding HARQ process by a logical channel priority that may be multiplexed and included in a data MAC PDU to be transmitted and included in the CG resource or that is multiplexed and included in the MAC PDU (820).

As already described with reference to FIG. 3, the MAC device may select a HARQ process with the highest priority and use the HARQ process for transmission of CG resources, but in the case that there are two or more HARQ processes with the highest priority, the MAC device needs to select only one HARQ process and use the HARQ process for CG transmission.

If there are not two or more HARQ processes with the highest priority (if there are not two or more HARQ processes with the highest priority of an uplink grant when used for CG transmission) (830), there is at most one HARQ process with the highest priority; thus, the MAC device may select a HARQ process with the highest priority as a prioritized HARQ process and use the HARQ process for transmission of CG resources (840). Other non-prioritized HARQ processes may become de-prioritized HARQ processes.

If there are two or more HARQ processes with the highest priority (if there are two or more HARQ processes with the highest priority of an uplink grant when used for CG transmission) in step 830, the MAC device may select a HARQ process that is a HARQ process for retransmission and that has the longest waiting time for the MAC PDU stored in the HARQ buffer and scheduled for transmission among HARQ processes with the highest priority as a prioritized HARQ process and use the HARQ process for selecting CG resources (850). This is because, even if the priority of the HARQ process is the same, it is effective for URLLC transmission to reduce transmissions with long delays by preferentially processing transmission of MAC PDUs that have been waiting for a long time.

In an embodiment, in step 830, the MAC device may identify whether there are two or more HARQ processes that maximize an uplink grant priority of the configured grant. In the case that there are two or more HARQ processes that maximize an uplink grant priority of the configured grant in step 830, in step 850, the MAC device may select a HARQ process that is a HARQ process for retransmission and that has the longest waiting time for the MAC PDU stored in the HARQ buffer and scheduled for transmission among HARQ processes that maximize an uplink grant priority of the configured grant as a prioritized HARQ process and use the HARQ process for transmission of the configured grant. In this case, in the case that there are two or more HARQ processes that maximize an uplink grant priority of the configured grant, but that there is only one HARQ process for retransmission, the HARQ process for retransmission has no choice but to be selected. Therefore, in step 850, among HARQ processes that maximize an uplink grant priority of the configured grant, the MAC device may select a HARQ process with the longest waiting time for the MAC PDU stored in the HARQ buffer and scheduled for transmission as a prioritized HARQ process and use the HARQ process for transmission of the configured grant. FIG. 9 is a flowchart illustrating a detailed operation of intra-CG prioritization according to an embodiment of the disclosure.

In the embodiment of FIG. 9, it is assumed that a timepoint that should select a HARQ process has reached for a CG resource in which an intra-CG prioritization operation is configured (910). The timepoint may be ahead of a timepoint of actual transmission in consideration of a processing time of the UE, as in the timepoint t1 illustrated in the embodiment of FIG. 2. For this purpose, a priority should be considered for each HARQ process. The priority of the HARQ process may be determined to be a priority value of an uplink grant to be transmitted when the HARQ process is selected. As described with reference to FIG. 3, this may be configured differently according to whether to perform new transmission or retransmission when the HARQ process is selected. In other words, this may be configured differently according to whether the transmission is transmission performed by acquiring a new MAC PDU without using the MAC PDU stored in the HARQ buffer or transmission using the MAC PDU stored in the HARQ buffer. That is, a priority of the corresponding HARQ process may be determined by a logical channel priority that may be multiplexed and included in a data MAC PDU to be transmitted and included in the CG resource or that is multiplexed and included in the MAC PDU (920).

As already described with reference to FIG. 3, the MAC device may select a HARQ process with the highest priority and use the HARQ process for transmission of CG resources, but in the case that there are two or more HARQ processes with the highest priority, the MAC device may select only one HARQ process and use the HARQ process for CG transmission. If there are not two or more HARQ processes with the highest priority (if there are not two or more HARQ processes with the highest priority of an uplink grant when used for CG transmission) (930), there is at most one HARQ process with the highest priority; thus, the MAC device may select a HARQ process with the highest priority as a prioritized HARQ process and use the HARQ process for transmission of CG resources (940). Other non-prioritized HARQ processes may become de-prioritized HARQ processes.

If there are two or more HARQ processes with the highest priority (if there are two or more HARQ processes with the highest priority of an uplink grant when used for CG transmission) in step 930, the MAC device may select a HARQ process that is a HARQ process for retransmission and that has the longest waiting time for the MAC PDU stored in the HARQ buffer and scheduled for transmission among HARQ processes with the highest priority as a prioritized HARQ process and use the HARQ process for selecting CG resources. However, if there are two or more HARQ processes with the highest priority and the longest MAC PDU waiting time, the MAC device may select a HARQ process with the smallest HARQ process ID (HPI) value (in other embodiments, the largest value may be selected) as a prioritized HARQ process and use the HARQ process for transmission of CG resources (950). This is because, even if the priority of the HARQ process is the same, it is effective for URLLC transmission to reduce transmissions with long delays by preferentially processing transmission of MAC PDUs that have been waiting for a long time. Further, a method of selecting a HARQ process based on the HPI may be effective in estimating a HARQ process status of the UE based on the HPI of the CG resource received by the base station.

In an embodiment, in step 930, the MAC device may identify whether there are two or more HARQ processes that maximize an uplink grant priority of the configured grant. In the case that there are two or more HARQ processes that maximize an uplink grant priority of the configured grant in step 930, in step 950, the MAC device may select a HARQ process that is a HARQ process for retransmission and that has the longest waiting time for the MAC PDU stored in the HARQ buffer and scheduled for transmission among HARQ processes that maximize an uplink grant priority of the configured grant as a prioritized HARQ process and use the HARQ process for transmission of the configured grant. In this case, in the case that there are two or more HARQ processes that maximize an uplink grant priority of the configured grant, but that there is only one HARQ process for retransmission, the HARQ process for retransmission has no choice but to be selected. Therefore, in step 950, among HARQ processes that maximize an uplink grant priority of the configured grant, the MAC device may select a HARQ process with the longest waiting time for the MAC PDU stored in the HARQ buffer and scheduled for transmission as a prioritized HARQ process and use the HARQ process for transmission of the configured grant. In the case that there are two or more HARQ processes with the longest MAC PDU waiting time, the MAC device may select a HARQ process with the smallest HARQ process ID as a prioritized HARQ process and use the HARQ process for transmission of configured grant resources. In another embodiment, in the case that there are two or more HARQ processes with the longest MAC PDU waiting time, the MAC device may select a HARQ process with the largest HARQ process ID as a prioritized HARQ process and use the HARQ process for transmission of configured grant resources.

Figure 10:
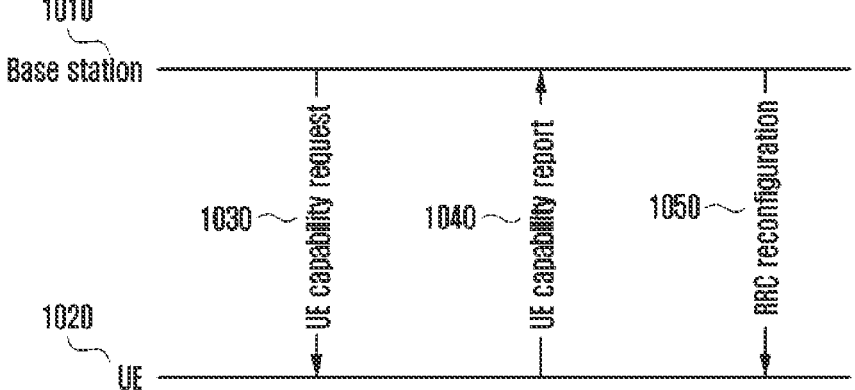
FIG. 10 is a diagram illustrating a configuration operation of intra-CG prioritization according to an embodiment of the disclosure.

FIG. 10 is a diagram illustrating a configuration operation of intra-CG prioritization according to an embodiment of the disclosure.

A base station 1010 needs to identify whether the UE having an RRC connection with the base station has an intra-CG prioritization function in order to configure a UE 1020 so that the UE 1020 performs an intra-CG prioritization operation. To this end, the base station may transmit a UE capability request message to the UE and request the UE to report whether the UE may perform an intra-CG prioritization function (1030). Thereafter, the UE may report whether the UE may perform an intra-CG prioritization operation using a UE capability report message (1040). The UE capability report message may report not only this but also other functions in which the UE may implement. For example, whether a logical channel-based prioritization (LCH-based prioritization) operation of selecting one uplink radio resource may be performed when multiple uplink grant overlap on the time axis may be included and transmitted together in the UE capability report message. The intra-CG prioritization operation is an operation performing when a HARQ process is selected, but is a prioritization operation using a logical channel priority, and in some embodiments, only a UE that may perform a logical channel-based prioritization operation may perform the intra-CG prioritization operation. The base station may configure an operation to be performed by the UE to the RRC reconfiguration message in consideration of functions that the UE may perform and that are included in the UE capability report message transmitted by the UE (1050). The UE may later perform the operation indicated in the RRC reconfiguration message.

FIG. 11 is a diagram illustrating initial transmission and retransmission determination operations of a configured grant according to an embodiment of the disclosure.

In the case that a timepoint that should select a HARQ process has reached for a CG resource in which an intra-CG prioritization operation is configured, the MAC device of the UE may determine a priority of the HARQ process and select a HARQ process based on this. The timepoint may be ahead of a timepoint of actual transmission in consideration of a processing time of the UE, as in the timepoint t1 illustrated in the embodiment of FIG. 2. In this case, the priority of the HARQ process may be determined differently according to whether transmission of the configured grant using the HARQ process is new transmission or retransmission, or whether the CGRT is running. Therefore, whether to perform new transmission or retransmission may be determined as follows according to whether the ConfiguredGrantTimer (CGT) is running, whether the CGRT is running, and whether the HARQ process is pending.

a. In the case that the CGT is not running and that the CGRT is not running and that the HARQ process is not a pending process, the HARQ process may be used for new transmission (1110).
  b. In the case that the CGT is not running and that the CGRT is not running and that the HARQ process is a pending process, the HARQ process may be used for retransmission (1120).
  c. In the case that the CGT is running and that the CGRT is not running, the HARQ process may be used for retransmission (1120).
  d. In the case that the CGRT is running, the HARQ process may not be used for transmission of CG resources (1130).

According to the embodiment, the HARQ process in which the CGRT is running may be configured to the lowest priority not to be selected as a prioritized HARQ process.

Figure 12:
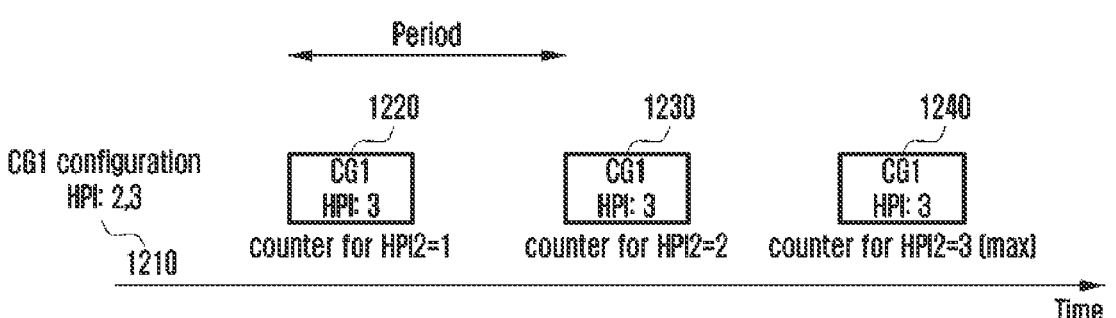
FIG. 12 is a diagram illustrating a detailed operation of intra-CG prioritization according to an embodiment of the disclosure.

FIG. 12 is a diagram illustrating a detailed operation of intra-CG prioritization according to an embodiment of the disclosure.

As described previously, in the case that an intra-CG prioritization operation is configured, the MAC device of the UE may select and transmit a HARQ process with the highest logical channel priority of data to be transmitted using each HARQ process. In such an intra-CG prioritization operation, because a logical channel priority of data stored in the HARQ buffer is relatively low, in the case that the HARQ process is not selected as a prioritized HARQ process, the HARQ process is not continuously selected as a prioritized HARQ process; thus, a problem may occur that transmission is not performed. This may result in excessive delay in specific transmission, and a problem may occur that untransmitted packets continue to occupy the HARQ process. To solve these problems, it is necessary to delete MAC PDUs that are not transmitted beyond a predetermined level and stored in the HARQ buffer. Deletion of these MAC PDUs may be performed by flushing the HARQ process.

The embodiment of FIG. 12 illustrates an operation of flushing the HARQ buffer of the HARQ process when the counter value reaches the maximum counter value by increasing the counter value by 1 in the case that the HARQ process is not selected as a prioritized HARQ process. A first configured grant resource configured in the embodiment of FIG. 12 indicates that the HPI is configured to use HARQ processes 2 and 3 (1210). Thereafter, in the first CG resource, a HARQ process of HPI3 is selected and indicates that the counter of HPI2 increases by 1 to be 1 (1220). An initial value of the counter becomes 0 and may be initialized in the case that a MAC PDU is generated, that a HARQ process is selected, or that other configurations are configured. Therefore, in this case, the counter of HPI3 may be configured to an initial value of 0. In a second CG resource, the HARQ process of HPI3 is selected and indicates that the counter of HPI2 increases by 1 to be 2 (1230). In this case, the counter of HPI3 may be configured to an initial value of 0. In a third CG resource, the HARQ process of HPI3 is selected and indicates that the counter of HPI2 increases by 1 to be 3. In this case, because the maximum value of the counter is configured to 3, the counter value has reached the maximum value and the HARQ buffer of HPI2 is flushed (1240). In this case, the counter of HPI3 may be configured to an initial value of 0.

Figure 13:
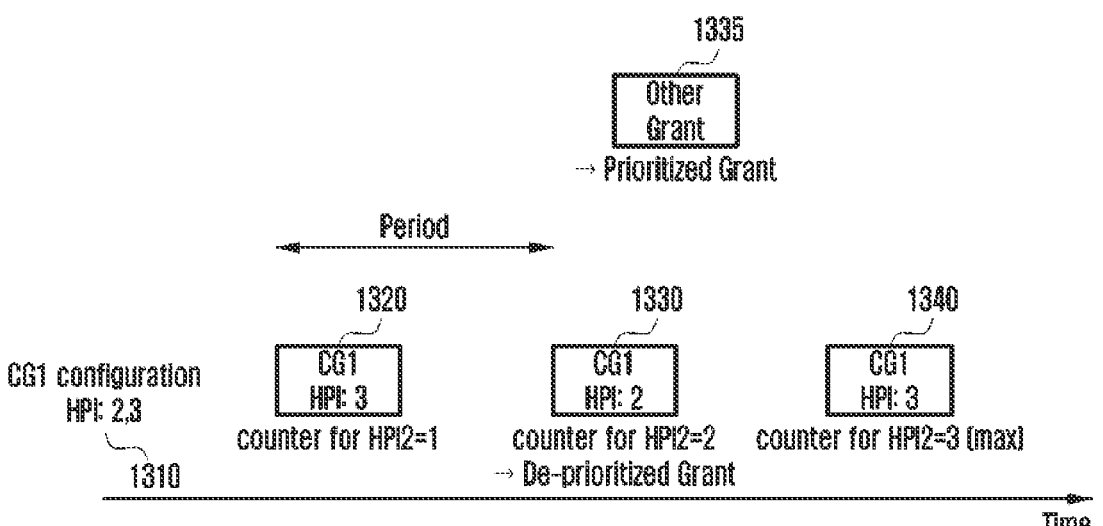
FIG. 13 is a diagram illustrating a detailed operation of intra-CG prioritization according to an embodiment of the disclosure.

FIG. 13 is a diagram illustrating a detailed operation of intra-CG prioritization according to an embodiment of the disclosure.

As described previously, in the case that an intra-CG prioritization operation is configured, the MAC device of the UE may select and transmit a HARQ process with a highest logical channel priority of data to be transmitted using each HARQ process. In such an intra-CG prioritization operation, because a logical channel priority of data stored in the HARQ buffer is relatively low, in the case that the HARQ process is not selected as a prioritized HARQ process, the HARQ process is not continuously selected as a prioritized HARQ process; thus, a problem may occur that transmission is not performed. This may result in excessive delay in specific transmission, and a problem may occur that untransmitted packets continue to occupy the HARQ process. To solve these problems, it is necessary to delete MAC PDUs that are not transmitted beyond a predetermined level but stored in the HARQ buffer. Deletion of these MAC PDUs may be performed by flushing the HARQ process.

The embodiment of FIG. 13 illustrates an operation of flushing the HARQ buffer of the HARQ process when the counter value reaches the maximum counter value by increasing the counter value by 1 in the case that transmission using the HARQ process is not performed. This may mean that a HARQ process is not selected in an intra-CG prioritization operation or that a HARQ processor was selected, but overlapping uplink grant or scheduling request resources occur in different time axes to be a de-prioritized uplink grant and are not transmitted. A first configured grant resource configured in the embodiment of FIG. 13 indicates that the HPI is configured to use HARQ processes 2 and 3 (1310). Thereafter, the HARQ process of HPI3 is selected in the first CG resource and indicates that the counter of HPI2 increases by 1 to be 1 (1320). An initial value of the counter becomes 0 and may be initialized in the case that a MAC PDU is generated, that a HARQ process is selected, or that other configurations are configured. Therefore, in this case, the counter of HPI3 may be configured to an initial value of 0. In a second CG resource, a HARQ process of HPI2 was selected, but there is another wireless resource 1335 overlapping on the time axis; thus, the resource become a prioritized (uplink) grant, and the CG resource became a de-prioritized uplink grant and indicates that transmission is not performed. Therefore, it indicates that the counter of HPI2 increases by 1 to be 2 (1330). In this case, the counter of HPI3 may be increased by 1. In a third CG resource, a HARQ process of HPI3 is selected and indicates that the counter of HPI2 increases by 1 to be 3. In this case, because the maximum value of the counter is configured to 3, the counter value has reached the maximum counter value and the HARQ buffer of HPI2 is flushed (1340). In this case, the counter of HPI3 may be configured to an initial value of 0.

Figure 14:
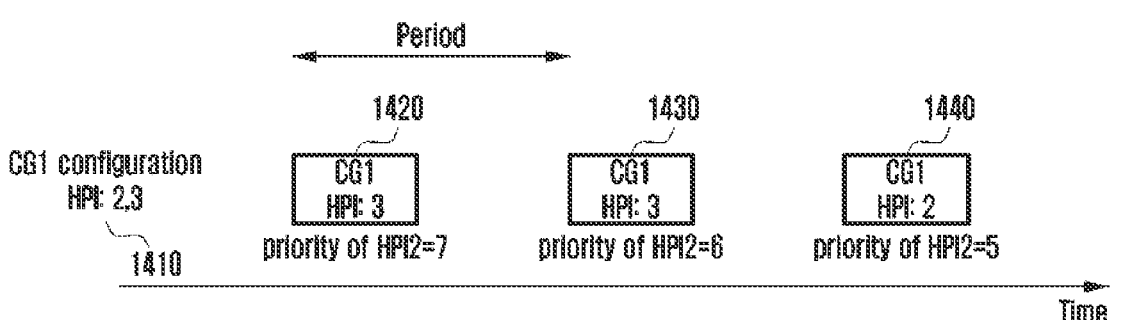
FIG. 14 is a diagram illustrating a detailed operation of intra-CG prioritization according to an embodiment of the disclosure.

FIG. 14 is a diagram illustrating a detailed operation of intra-CG prioritization according to an embodiment of the disclosure.

As described previously, in the case that an intra-CG prioritization operation is configured, the MAC device of the UE may select and transmit a HARQ process with the highest logical channel priority for data to be transmitted using each HARQ process. In such an intra-CG prioritization operation, because a logical channel priority of data stored in the HARQ buffer is relatively low, in the case that the HARQ process is not selected as a prioritized HARQ process, the HARQ process is not continuously selected as a prioritized HARQ process; thus, a problem may occur that transmission is not performed. This may result in excessive delay in specific transmission, and a problem may occur that untransmitted packets continue to occupy the HARQ process. To solve these problems, in the case that the HARQ process is not selected, it is necessary to increase the priority of the HARQ process by a predetermined level to increase the possibility of being selected as a priority later.

The embodiment of FIG. 14 illustrates an operation of increasing the possibility of selection of the corresponding HARQ process in CG resources later by increasing the priority of the HARQ process by 1 in the case that the HARQ process is not selected as a prioritized HARQ process. In FIG. 14, the priority is illustrated to increase by 1, but it is also possible to increase the priority by a preconfigured value. Because a low priority value means a high priority, increasing the priority means lowering a priority value. A first configured grant resource configured in the embodiment of FIG. 14 indicates that the HPI is configured to use HARQ processes 2 and 3 (1410). Thereafter, HPI2 having a priority 7 in a first CG resource is not prioritized and represents that HPI3 is selected (1420). In step 1420, because the HARQ process of HPI2 was not selected as a prioritized HARQ process, the priority of the HARQ process of HPI2 rises by one level to 6. Thereafter, the CG resource performs an intra-CG prioritization operation with a priority of 6, but HPI3 is selected and the HARQ process of HPI2 is not prioritized (1430). In step 1430, because the HARQ process of HPI2 was not selected as a prioritized HARQ process, a priority of the HARQ process of HPI2 rises by one level to 5. Thereafter, in the CG resource, an intra-CG prioritization operation was performed with a priority of 5, and the HARQ process of HPI2 is selected and transmitted as a prioritized HARQ process (1440). An operation of increasing the priority as transmission is delayed may have the effect of reducing transmission delay by promoting the transmission of data with severe transmission delay.

Figure 15:
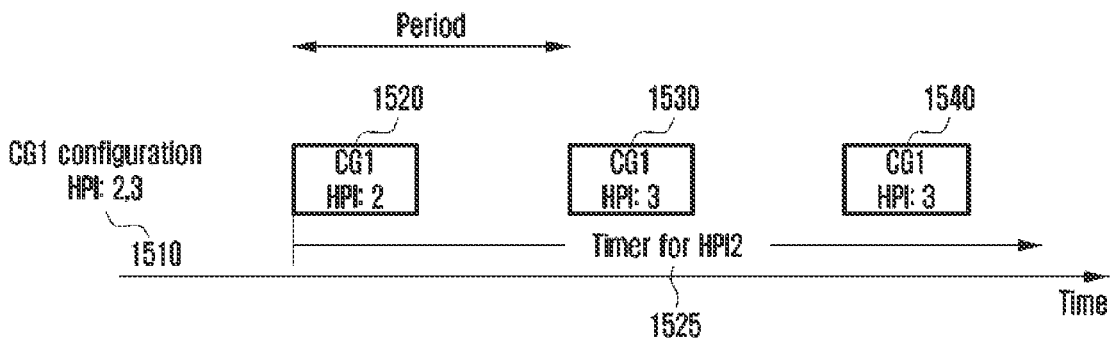
FIG. 15 is a diagram illustrating a detailed operation of intra-CG prioritization according to an embodiment of the disclosure.

FIG. 15 is a diagram illustrating a detailed operation of intra-CG prioritization according to an embodiment of the disclosure.

As described previously, in the case that an intra-CG prioritization operation is configured, the MAC device of the UE may select and transmit a HARQ process with a highest logical channel priority of data to be transmitted using each HARQ process. In such an intra-CG prioritization operation, because a logical channel priority of data stored in the HARQ buffer is relatively low, in the case that the HARQ process is not selected as a prioritized HARQ process, the HARQ process is not continuously selected as a prioritized HARQ process; thus, a problem may occur that transmission is not performed. This may result in excessive delay in specific transmission, and a problem may occur that untransmitted packets continue to occupy the HARQ process. To solve these problems, it is necessary to delete MAC PDUs that are not transmitted beyond a predetermined level but stored in the HARQ buffer. Deletion of these MAC PDUs may be performed by flushing the HARQ process.

The embodiment of FIG. 15 illustrates an operation of operating a timer from a timepoint at which a MAC PDU is generated in the HARQ process and flushing the HARQ buffer of the HARQ process in the case that the timer has expired. The timer may operate for each HARQ process, and a timer value may be configured in advance or may be configured by an RRC reconfiguration message of the base station. A first configured grant resource configured in the embodiment of FIG. 15 indicates that the HPI is configured to use HARQ processes 2 and 3 (1510). Thereafter, a HARQ process of HPI2 is selected in the first CG resource (1520) and indicates that the timer for HPI2 is started (1525). In a second CG resource, a HARQ process of HPI3 was selected, and the HARQ process of HPI2 did not obtain a transmission opportunity; thus, the timer for HPI2 may continue to run (1530). In a third CG resource, a HARQ process of HPI3 was selected, and a timer for the HARQ process of HPI2 continued to run (1540), and then in the case that the timer has expired, by flushing the HARQ buffer of HPI2, transmission of the HARQ process with delayed transmission may be no longer performed.

Figure 16:
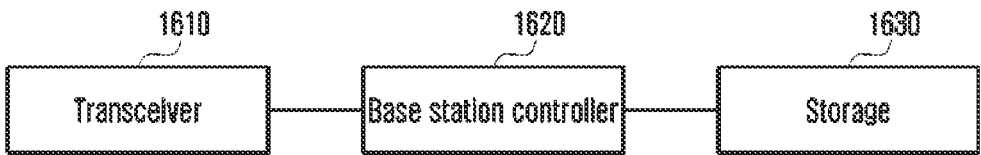
FIG. 16 is a block diagram illustrating a structure of a base station according to an embodiment of the disclosure.

FIG. 16 is a block diagram illustrating a structure of a base station according to an embodiment of the disclosure.

With reference to FIG. 16, the base station may include a transceiver 1610, a controller 1620, and a storage 1630. In the disclosure, the controller 1620 may be defined as a circuit, an application-specific integrated circuit, or at least one processor. The transceiver 1610 may transmit and receive signals to and from other network entities. For example, the transceiver 1610 may transmit system information to the UE and transmit a synchronization signal or a reference signal. The controller 1620 may control the overall operation of the base station according to the embodiment proposed in the disclosure. For example, the controller 1620 may control signal flow between each block to perform operations according to the flowchart described above. The storage 1630 may store at least one of information transmitted and received through the transceiver 1610 or information generated through the controller 1620.

Figure 17:
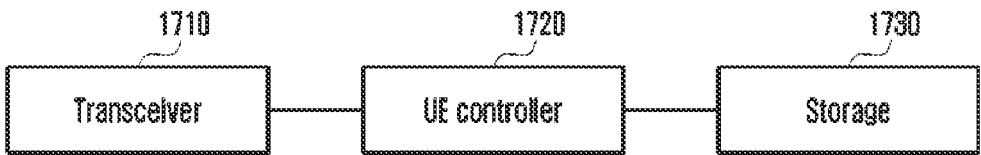
FIG. 17 is a block diagram illustrating a structure of a terminal according to an embodiment of the disclosure.

FIG. 17 is a block diagram illustrating a structure of a UE according to an embodiment of the disclosure.

With reference to FIG. 17, the UE may include a transceiver 1710, a controller 1720, and a storage 1730. In the disclosure, the controller may be defined as a circuit, an application-specific integrated circuit, or at least one processor. The transceiver 1710 may transmit and receive signals to and from other network entities. For example, the transceiver 1710 may receive system information from the base station and receive a synchronization signal or a reference signal. The controller 1720 may control the overall operation of the UE according to the embodiment proposed in the disclosure. For example, the controller 1720 may control signal flow between each block to perform operations according to the flowchart described above. The storage 1730 may store at least one of information transmitted and received through the transceiver 1710 or information generated through the controller 1720.

In the above-described specific embodiments of the disclosure, components included in the disclosure have been expressed in the singular or the plural according to the presented specific embodiments. However, the singular or plural expression is appropriately selected for a presented situation for convenience of description, and the disclosure is not limited to the singular or plural components, and even if a component is represented in the plural, it may be composed of the singular, or even if a component is represented in the singular, it may be composed of the plural.

In the detailed description of the disclosure, specific embodiments have been described, but various modifications are possible without departing from the scope of the disclosure. Therefore, the scope of the disclosure should not be limited to the described embodiments and should be defined not only by the claims described below, but also by equivalents of these claims.

The invention claimed is:

1. A method performed by a terminal in a wireless communication system, the method comprising:
   receiving, from a base station, configured grant (CG) configuration information including configuration information on intra-CG prioritization through a radio resource control (RRC) message;
   identifying a priority of a hybrid automatic repeat request (HARQ) process, wherein in case that a medium access control protocol data unit (MAC PDU) to be transmitted is not stored in a HARQ buffer, the priority of a HARQ process is determined by a highest priority among priorities of logical channels that have data available; and
   transmitting, to the base station, a MAC PDU corresponding to the HARQ process based on the CG configuration information.

2. The method of claim 1, wherein in case that the MAC PDU to be transmitted is stored in the HARQ buffer, the priority of a HARQ process is determined by the highest priority among priorities of logical channels multiplexed in the MAC PDU.

3. The method of claim 2, further comprising:
   selecting a HARQ process with the highest priority among one or more HARQ processes determined based on the case that a MAC PDU to be transmitted is stored in the HARQ buffer of the HARQ process, and one or more HARQ processes determined based on the case that a MAC PDU to be transmitted is not stored in the HARQ buffer of the HARQ process.

4. The method of claim 1, wherein at least one of the logical channels is composed of a logical channel configured to use the CG resource based on the CG configuration information.

5. The method of claim 1, further comprising:
   selecting a HARQ process with the highest priority for retransmission, in case that there are at least one HARQ process with the highest priority for retransmission and at least one HARQ process with the highest priority for initial transmission.

6. A terminal in a wireless communication system, the terminal comprising:
   a transceiver; and
   a controller,
   wherein the controller is configured to:
   receive, from a base station, configured grant (CG) configuration information including configuration information on intra-CG prioritization through a radio resource control (RRC) message,
   identify a priority of a hybrid automatic repeat request (HARQ) process, wherein in case that a medium access control protocol data unit (MAC PDU) to be transmitted is not stored in a HARQ buffer, the priority of a HARQ process is determined by a highest priority among priorities of logical channels that have data available, and transmit, to the base station, a MAC PDU corresponding to the HARQ process based on the CG configuration information.

7. The terminal of claim 6, wherein in case that the MAC PDU to be transmitted is stored in the HARQ buffer, the priority of a HARQ process is determined by the highest priority among priorities of logical channels multiplexed in the MAC PDU.

8. The terminal of claim 7, wherein the controller is configured to select a HARQ process with the highest priority among one or more HARQ process es determined based on the case that a MAC PDU to be transmitted is stored in the HARQ buffer of the HARQ process, and one or more HARQ process es determined based on the case that a MAC PDU to be transmitted is not stored in the HARQ buffer of the HARQ process.

9. The terminal of claim 6, wherein at least one of the logical channels is composed of a logical channel configured to use the CG resource based on the CG configuration information.

10. The terminal of claim 6, wherein the controller is configured to select a HARQ process with the highest priority for retransmission, in the case that there are at least one HARQ process with the highest priority for retransmission and at least one HARQ process with the highest priority for initial transmission.

11. A method performed by a base station in a wireless communication system, the method comprising:

transmitting, to a terminal, configured grant (CG) configuration information including configuration information on intra-CG prioritization through a radio resource control (RRC) message; and receiving, from the terminal, a medium access control protocol data unit (MAC PDU) through a CG resource determined based on the CG configuration information, wherein the MAC PDU is a MAC PDU corresponding to a HARQ process with a highest priority among at least one hybrid automatic repeat and request (HARQ) process identified by the terminal, and wherein in case that a medium access control protocol data unit (MAC PDU) to be transmitted is not stored in a HARQ buffer, a priority of a HARQ process is determined by the highest priority among priorities of logical channels that have data available.

12. A base station in a wireless communication system, the base station comprising:

a transceiver; and a controller, wherein the controller is configured to:

transmit, to a terminal, configured grant (CG) configuration information including configuration information on intra-CG prioritization through a radio resource control (RRC) message, and receive, from the terminal, a medium access control protocol data unit (MAC PDU) through a CG resource determined based on the CG configuration information, wherein the MAC PDU is a MAC PDU corresponding to a HARQ process with a highest priority among at least one hybrid automatic repeat and request (HARQ) process identified by the terminal, and wherein in case that a medium access control protocol data unit (MAC PDU) to be transmitted is not stored in a HARQ buffer, a priority of a HARQ process is determined by the highest priority among priorities of logical channels that have data available.

* * * * *